United States Patent
Stegmiller et al.

(10) Patent No.: US 11,053,078 B1
(45) Date of Patent: Jul. 6, 2021

(54) LOAD REACTIVE BRAKING SYSTEMS AND DEVICES

(71) Applicant: GOODRICH CORPORATION, Charlotte, NC (US)

(72) Inventors: Wesley K. Stegmiller, Jamestown, ND (US); Wallace Harold Larson, Jamestown, ND (US); Dustin Paul Scheer, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/808,204

(22) Filed: Mar. 3, 2020

(51) Int. Cl.
| | |
|---|---|
| *B65G 13/00* | (2006.01) |
| *F16D 65/18* | (2006.01) |
| *B65G 65/00* | (2006.01) |
| *B64D 9/00* | (2006.01) |
| *B65G 13/075* | (2006.01) |
| *F16D 55/36* | (2006.01) |

(52) U.S. Cl.
CPC ............... *B65G 13/00* (2013.01); *B64D 9/00* (2013.01); *B65G 13/075* (2013.01); *B65G 65/005* (2013.01); *F16D 65/186* (2013.01); *B64D 2009/006* (2013.01); *F16D 55/36* (2013.01)

(58) Field of Classification Search
CPC ........ F16D 51/00; F16D 65/186; F16D 55/36; F16D 59/00; B64D 2009/006; B64D 9/00; B65G 13/00; B65G 13/075; B65G 39/00; B65G 65/00; B65G 2250/02
USPC ....................................... 244/118.1; 188/134
See application file for complete search history.

(56) References Cited

U.S. PATENT DOCUMENTS

| | | | | |
|---|---|---|---|---|
| 3,285,377 | A * | 11/1966 | Rasmussen | F16D 59/00 192/223.3 |
| 3,713,521 | A | 1/1973 | Moritake | |
| 3,768,629 | A * | 10/1973 | Bennett | B65G 25/02 198/721 |
| 3,789,960 | A * | 2/1974 | Warren | F16D 63/00 188/74 |
| 5,147,020 | A | 9/1992 | Scherman et al. | |
| 5,642,799 | A | 7/1997 | Warrilow | |
| 6,131,717 | A | 10/2000 | Owen | |
| 6,256,835 | B1 | 7/2001 | Wang | |
| 6,336,542 | B1 * | 1/2002 | Mintonye, II | B65G 13/075 193/35 A |
| 6,464,061 | B1 * | 10/2002 | Inoue | F16D 7/028 188/134 |

(Continued)

FOREIGN PATENT DOCUMENTS

WO       2011032641       3/2011

OTHER PUBLICATIONS

USPTO, Pre-Interview First Office Action dated Feb. 22, 2017 in U.S. Appl. No. 15/154,556.

(Continued)

*Primary Examiner* — Gene O Crawford
*Assistant Examiner* — Lester Rushin, III
(74) *Attorney, Agent, or Firm* — Snell & Wilmer L.L.P.

(57) ABSTRACT

A roller assembly comprises a first axle having a first inner shaft and a second axle having a second inner shaft. The roller assembly may further comprise a plurality of roller elements between the first inner shaft and the second inner shaft. The roller assembly may further comprise a roller disposed between a first tension strap and a second tensions strap.

15 Claims, 5 Drawing Sheets

SECT A-A

(56) References Cited

U.S. PATENT DOCUMENTS

| | | |
|---|---|---|
| 8,109,702 B2 | 2/2012 | Stegmiller |
| 8,387,919 B2 | 3/2013 | Huber et al. |
| 9,156,627 B2 | 10/2015 | Mathi |
| 9,845,196 B2 | 12/2017 | Larson |
| 10,882,698 B2 * | 1/2021 | Shivalinga .............. F16D 11/10 |

OTHER PUBLICATIONS

USPTO, First Action Interview Office Action dated Apr. 18, 2017 in U.S. Appl. No. 15/154,556.
USPTO, Notice of Allowance dated Oct. 23, 2017 in U.S. Appl. No. 15/154,556.

* cited by examiner

SECT A-A

SECT B-B

LOAD REACTIVE BRAKING SYSTEMS AND DEVICES

FIELD

The disclosure relates generally to reactive load braking, and more particularly, to systems and devices for load reactive braking in cargo movement.

BACKGROUND

Rollers, coasters, and other wheeled mechanisms are often used to move loads. For heavy loads, the rollers may have an associated braking mechanism to prevent loss of control. In cargo loading systems, for example, braking rollers may have the brake arrangement preset at or near the maximum braking load that is selected for a maximum weight cargo container at the maximum angle of the cargo floor. In most cases, the strong brakes on the rollers are too powerful to allow the roller to roll under light loads. Braking rollers often have a friction material around the outer surface. In instances where the load applied to the roller is not enough to overcome the braking mechanism, the container skids over the roller and creates flat spots on the roller.

SUMMARY

A roller assembly is disclosed herein. The roller assembly may comprise: a first axle including a first flange and a first inner shaft; a second axle including a second flange and a second inner shaft, the first inner shaft extending from the first flange toward the second flange, the second inner shaft extending from the second flange toward the first flange; and a first plurality of roller elements disposed between a radially outer surface of the second inner shaft and a radially inner surface of the first inner shaft.

In various embodiments, the roller assembly may further comprise a biasing member including at least one link or cam roller positioned at an angle relative the roller axis producing an axial force proportional to the applied load on the roller reacting on to the first or second inner shaft, and the second inner shaft may comprise a plurality of grooves configured to receive the first plurality of roller elements. The plurality of grooves may be semi-spherical in shape. The roller assembly wherein may comprise at least one biasing member including at least one of a torsion spring, a compression spring or a spring washer reacting on to the first or second inner shaft. The roller assembly may further comprise a first coupling disposed between a first support bearing and a first outer shaft of the first axle, the first outer shaft extending from the first flange away from the second flange, and a second plurality of roller elements disposed between a radially outer surface of the first outer shaft and a radially inner surface of the first coupling. The roller assembly may further comprise a second coupling disposed between a second support bearing and a second outer shaft of the first axle, the second outer shaft extending from the second flange away from the first flange, and a third plurality of roller elements are disposed between a radially outer surface of the first outer shaft and a radially inner surface of the coupling. The roller assembly may further comprise a roller, a first side plate coupled to the first coupling, and a second side plate disposed opposite the first side plate, the roller disposed between the first side plate and the second side plate. The roller assembly may further comprise a first tension strap extending from the first side plate to the second side plate and a second tension strap extending from the first side plate to the second side plate, the roller disposed between the first tension strap and the second tension strap.

A roller assembly for a cargo loading system is disposed herein. The roller assembly may comprise: a roller having an outer surface; a housing radially inward from the outer surface; a first side plate; a second side plate disposed opposite the first side plate, the roller disposed between the first side plate and the second side plate; a first tension strap extending from the first side plate and the second side plate, the roller disposed adjacent to the first tension strap; a brake arrangement retained within the housing; and an axle assembly disposed at least partially within the housing, the axle assembly configured to apply a compressive force to the brake arrangement.

In various embodiments, the axle assembly may comprise a first axle having a first inner shaft and a second axle having a second inner shaft, the second inner shaft disposed radially inward of the first inner shaft. The roller assembly may further comprise a plurality of roller elements disposed between the first inner shaft and the second inner shaft. The brake arrangement may be configured to produce a braking force proportional to a load on the outer surface. The axle assembly may comprise a first plunger and a second plunger configured to apply the compressive force to the brake arrangement. The first plunger and the second plunger may be configured to translate towards the brake arrangement in response a load on the outer surface. The roller assembly may further comprise a second tension strap extending from the first side plate to the second side plate, the roller disposed between the first tension strap and the second tension strap.

A cargo loading system is disclosed herein. The cargo loading system may comprise: a tray having a first side wall, a second side wall, and a base extending between the first side wall and the second side wall; a roller assembly having a roller and disposed between the first side wall and the second side wall, the roller assembly, the roller assembly including a brake arrangement positioned at least partially within a housing of the roller assembly and configured to increase resistance to rotation of the housing proportionally to a load applied against an outer surface of the roller.

In various embodiments, the roller assembly may comprise a first tension strap coupled to the first side wall and the second side wall and a second tension strap coupled to the first side wall and the second side wall, the roller disposed between the first tension strap and the second tension strap. The roller assembly may comprise a first axle having a first inner shaft, a second axle having a second inner shaft, and a first plurality of roller elements disposed between the first inner shaft and the second inner shaft. The roller assembly may further comprise a first coupling and a first bearing support, wherein the first axle further comprises a first outer shaft, wherein the first coupling is disposed between the first bearing support and the first outer shaft, and wherein a second plurality of roller elements are disposed between the first coupling and the first outer shaft. The roller assembly may further comprise a second coupling and a second bearing support, wherein the second axle further comprises a second outer shaft, wherein the second coupling is disposed between the second bearing support and the second outer shaft, and wherein a third plurality of roller elements are disposed between the second coupling and the second outer shaft. The second inner shaft may comprise a plurality of grooves disposed in a radially outer surface of the second inner shaft, and the first plurality of roller elements may be disposed in the plurality of grooves.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
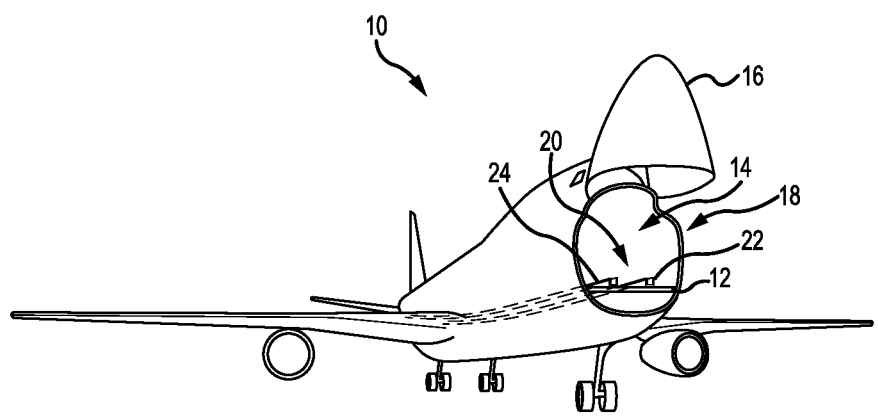
FIGS. 1A and 1B illustrate schematic views of a cargo handling system, in accordance with various embodiments.
Figure 1B:
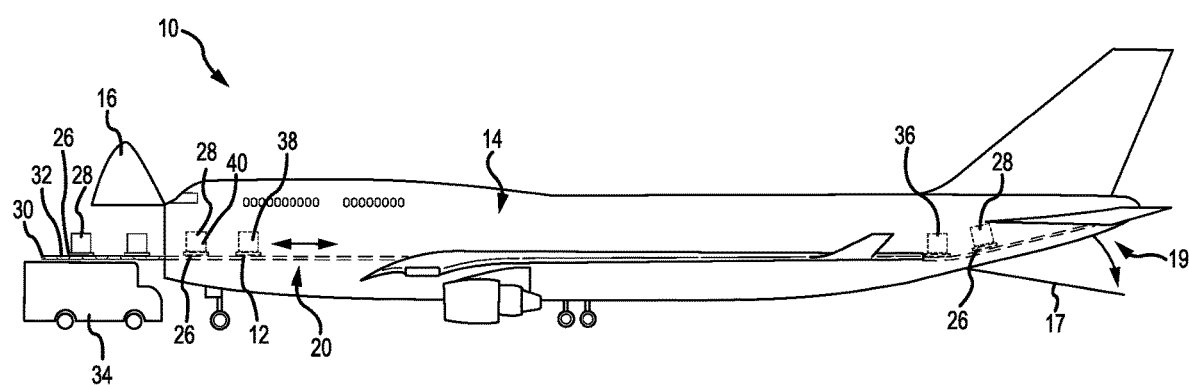

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more trays 20, e.g., a first tray 22 and a second tray 24, extend generally from the fore end of the aircraft 10 to the aft end of the aircraft 10. As described more fully below, the one or more trays 20 provide a support structure for which a platform 26 may transit along a length of the aircraft 10 between the fore end and the aft end and carry a ULD or some other form of cargo carrier, such as, for example, a container of a size typically used for ocean-going transport by ship or truck. Without loss of generality, a cargo load 28 of any size or shape, which may include objects within containers or ULDs or objects not within containers or ULDs, such as, for example, automobiles or the like, will be considered herein as configured for transport on the platform 26.

Still referring to FIGS. 1A and 1B, in various embodiments, the one or more trays 20, during loading or unloading of the cargo load 28, may be connected to a loading structure 30 which, in various embodiments, may comprise one or more trays 32 that correspond to the one or more trays 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more trays 20 and the loading structure 30 are located substantially at the same elevation and configured to transition a platform 26 either onto or off from the one or more trays 20. For example, a first cargo load 36 may be transitioned from the loading structure 30, through the opening 18 and onto the one or more trays 20, and then along the one or more trays 20 to the aft end of the aircraft, where the first cargo load is secured for transport. This may be followed by a second cargo load 38, a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To ensure cargo loads are restrained, the aircraft 10 may include a restraint assembly as described herein and in accordance with various embodiments.

Figure 2:
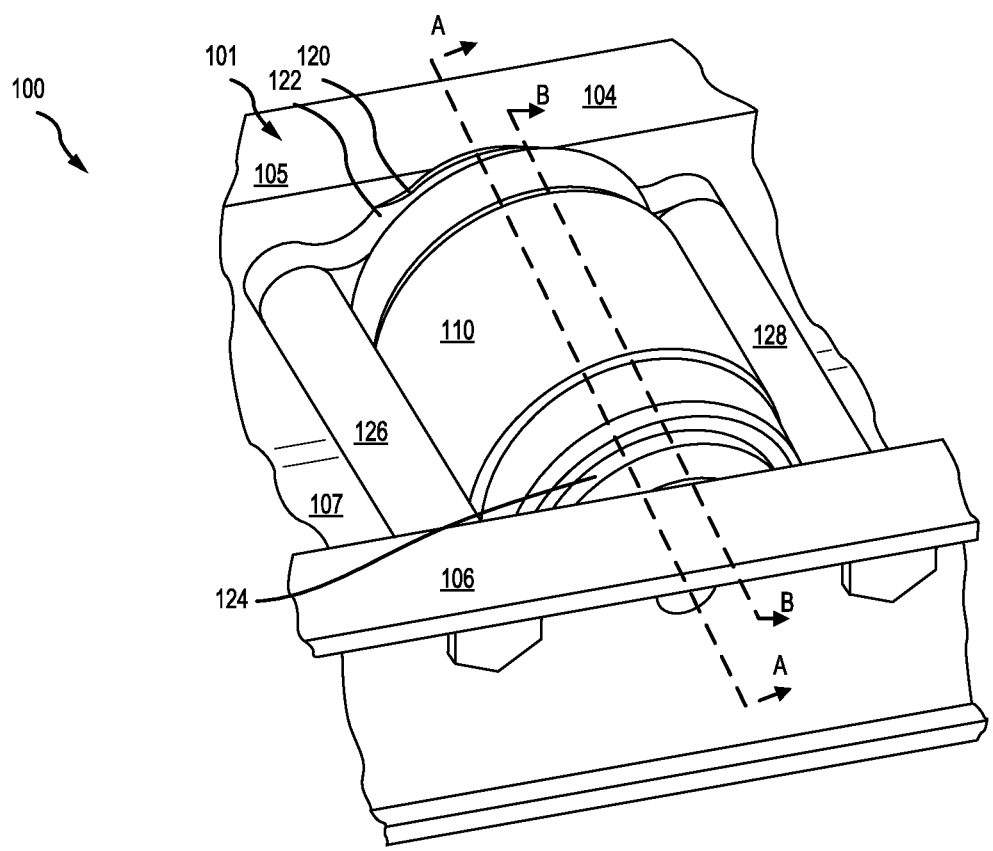
FIG. 2 illustrates a portion of a cargo handling system, in accordance with various embodiments.

Referring now to FIG. 2, a perspective view of a roller assembly 100 of a cargo loading system 101 is shown, in accordance with various embodiments. Roller assembly 100 may support cargo on tray 104 (e.g., trays 20 from FIG. 1A). Roller assembly 100 may include a roller 110 and a roller support structure 120. Roller 110 may be coupled to roller support structure 120 that and be configured to retain roller 110 relative to tray 104. Roller 110 may include an internal braking mechanism configured to increase braking force in response to the mass of cargo. The braking force applied by roller assembly 100 may have a linear relationship with the mass of the load supported by roller assembly 100. In various embodiments, the tray 104 may include a first side wall 105, a second side wall 106 and a base 107 extending between the first side wall 105 and the second side wall 106. The roller support structure 120 may include a first side plate 122 and a second side plate 124. The first side plate 122 may be disposed adjacent to the first side wall 105 of the tray 104 and the second side plate 124 may be disposed adjacent to the second side wall 106 of the tray 104.

In various embodiments, a first tension strap 126 may extend from the first side plate 122 to the second side plate 124. The first tension strap 126 may be disposed at a forward end of the roller assembly 100. Similarly, a second tension strap 128 may extend from the first side plate 122 to the second side plate 124. The second tension strap 128 may be disposed at an aft end of the roller assembly 100. The roller 110 may be disposed between the first tension strap 126 and the second tension strap 128. The tension straps 126, 128 provide lateral support when the roller assembly 100 experiences reaction loads during braking of the roller assembly 100, or the like. The tension straps 126, 128 may be coupled to the side walls 105, 106 of tray 104 by fasteners, such as bolts in inserts, or the like.

Figure 3:
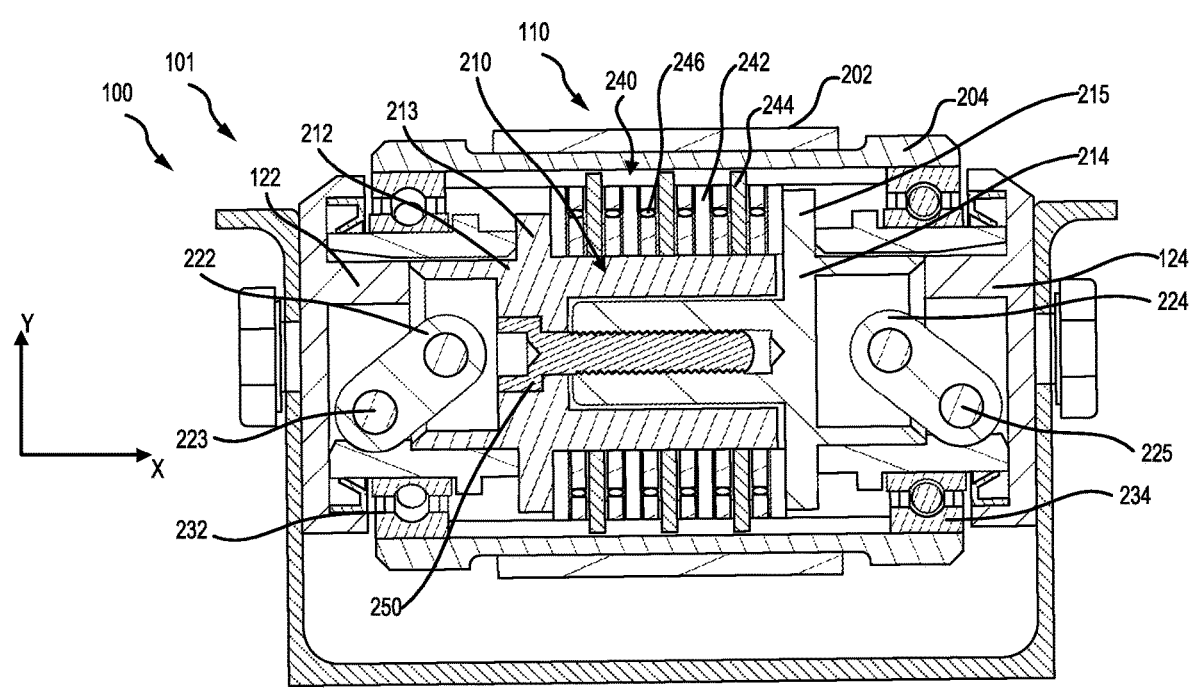
FIG. 3 illustrates a cross-sectional view of a roller assembly, in accordance with various embodiments.

Referring now to FIG. 3, a cross-sectional view along section line A-A in FIG. 2 of the roller assembly 100 of the cargo loading system 101 is illustrated, in accordance with various embodiments. Roller 110 is configured to rotate about axle assembly 210, which extends in the x direction and may serve as both an axis of symmetry and an axis of rotation for roller assembly 100. The axle assembly 210 may comprise a first axle 212 and a second axle 214. The first axle 212 may be coupled to the first side plate 122 of the roller support structure 120 by a first linkage 222. Similarly, the second axle 214 may be coupled to the second side plate 124 of the roller support structure 120 by a second linkage 224. In various embodiments, first linkage 222 is mechanically coupled to first axle 212 and the first side plate 122 at an angle with the mounting point of first linkage 222 to first axle 212 offset in the y direction from the mounting point of first linkage 222 to first side plate 122. The angle of first linkage 222 may be oriented so that an increased load on outer surface 202 of roller in the y direction urges roller 110 towards base 107 of tray 104. Thus, increased load on outer surface 202 of roller 110 in the y direction may decrease the offset in the y direction of mounting point of first linkage 222 to first axle 212 from the mounting point of first linkage 222 to first side plate 122, thereby generating a compressive force on first axle 212 in the x direction.

Axle assembly 210 may act as a spring in the x direction and compress in the x direction in in response to a load applied to outer surface 202 in the y direction. A separate biasing member, such as a torsion spring, a compression spring, a spring washer, or the like can be positioned and configured to urge the first axle 212 and second axle 214 in the Y direction opposite to that of the load applied to the outer surface 202. Axle assembly 210 may decompress or expand in the x direction back to its original state in response to the load being removed from outer surface 202. First axle 212 may slideably engage an inner diameter of a first support bearing 232 and the second axle 214 may slidably engage an inner diameter of a second support bearing 234 as the axle compresses and decompresses.

As illustrated in FIG. 3, first axle 212 may comprise plunger 213 and second axle 214 may comprise plunger 215 with the plungers disposed radially inward from outer surface 202. Plunger 213 (and first axle 212) may be configured to translate in the x direction relative to plunger 215 (and second axle 214). First axle 212 and second axle 214 may each be a portion of the complete axle extending through housing 204 and support bearings 232, 234. Plunger 213 of first axle 212 and plunger 215 of second axle 214 may thus be configured to apply compressive force to brake arrangement 240 in response to the compression of first axle 212 and second axle 214 in the x direction.

In various embodiments, brake arrangement 240 may comprise drive disks 244, brake disks 242, and skewed roller elements 246. Drive disks 244 may be coupled to housing 204 and configured to rotate with housing 204. Brake disks 242 may be coupled to first axle 212, and thus may be rotationally fixed. Skewed roller elements 246 may be disposed between brake disks 242 and drive disks 244 and configured to generate drag. The skewed roller elements 246 may be configured to create friction with drive disks 244 and brake disks 242 in response to the compression of second axle 214 and first axle 212 in the x direction. A load applied at outer surface 202 in the y direction may cause linkages 222, 224 to rotate about pivot (e.g., first pivot 223 and second pivot 225), thereby urging first axle 212 and second axle 214 toward one another and thereby compressing drive disks 244 between brake disks 242. An increased axial (i.e., in the x direction) compressive load between brake disks 242 and drive disks 244 may increase braking force, which is proportional to the load on outer surface 202.

In various embodiments, brake arrangement 240 may be disposed between plunger 213 and plunger 215 and radially inward from outer surface 202. Brake arrangement 240 may resist rotation in response to the compressive force between plunger 213 towards plunger 215 generated in response to a load applied at outer surface 202. In response to a load being removed from outer surface 202, brake arrangement 240 may urge plunger 213 away from plunger 215. Brake arrangement 240 may thus provide the expanding force for the spring-like behavior of first axle 212 and second axle 214 by pushing outward in the x direction against plunger 213 and plunger 215 of first axle 212 and second axle 214. In various embodiments, first axle 212 may be coupled to second axle 214, by a fastener, by a loose fit, by a pilot, or the like. For example, first axle 212 may be coupled to second axle 214 by fastener 250. Fastener 250 may define a centerline of roller 110. For example, in various embodiments, housing 204 of roller 110 may be an annular housing about the centerline defined by fastener 250.

Figure 4:
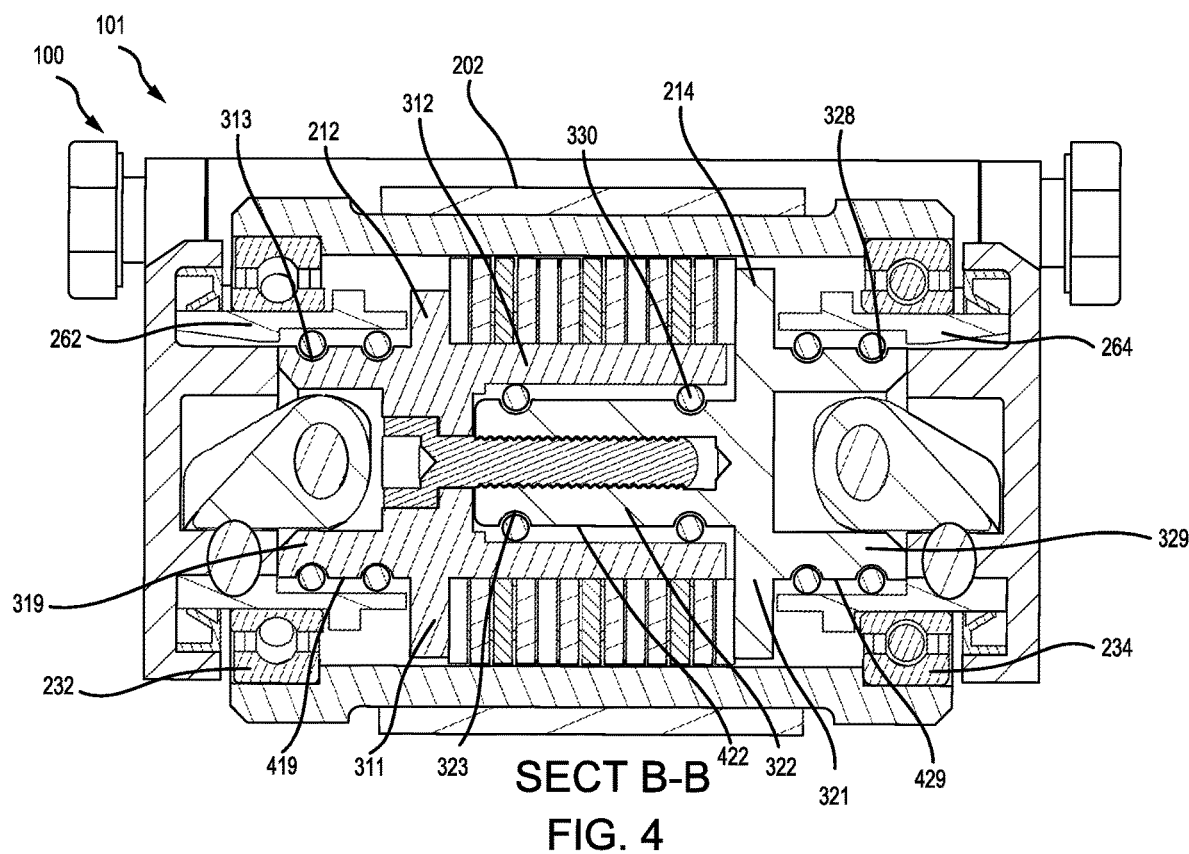
FIG. 4 illustrates a cross-sectional view of a roller assembly, in accordance with various embodiments.

Referring now to FIG. 4, a cross-sectional view along section line B-B (e.g., a 45 degree plane from the X-Z plane) from FIG. 3 is illustrated, in accordance with various embodiments. In various embodiments, the first axle 212 comprises a flange 311 and the second axle 214 comprises a flange 321. The brake arrangement 240 may be disposed between flange 311 and flange 321. The first axle 212 may further comprise a inner shaft 312 extending from flange 311 of first axle 212 towards flange 321 of second axle 214. Similarly, the second axle 214 may further comprise an inner shaft 322 extending from flange 321 of second axle 214 towards flange 311 of first axle 212. The inner shaft 322 of second axle 214 may be disposed radially inward of inner shaft 312 of first axle 212.

In various embodiments, the first axle 212 may further comprise an outer shaft 319 extending from flange 311 of first axle 212 away from flange 321 of second axle 214. Similarly, the second axle 214 may further comprise an outer shaft 329 extending from flange 321 of second axle 214 away from flange 311 of first axle 212. The inner shaft 322 of second axle 214 may be disposed radially inward of inner shaft 312 of first axle 212. In various embodiments, the roller assembly 100 further comprises a first coupling 262 and a second coupling 264. The first coupling 262 may be disposed radially between the first support bearing 232 and the outer shaft 319 of the first axle 212. Similarly, the second coupling 264 may be disposed radially between the second support bearing 234 and the outer shaft 329 of the second axle 214.

Inner shaft 322 of second axle 214 may comprise a plurality of grooves 323 disposed in a radially outer surface 422 of the inner shaft 322. Similarly, the outer shaft 319 of the first axle 212 may comprise a plurality of grooves 313 disposed on a radially outer surface 419 of the outer shaft 319 and the outer shaft 329 of the second axle 214 may comprise a plurality of grooves 328 disposed in a radially outer surface 429 of the outer shaft 329 of the second axle 214. Each groove in the plurality of grooves 323, 313, 328 may be semi-spherical in shape and/or configured to receive a roller element 330 therein. For example, roller elements 330 may be disposed between a respective groove in the plurality of grooves 323 and a radially inner surface of the inner shaft 312 of the first axle 212. Similarly, roller elements 330 may be disposed between a respective groove in the plurality of grooves 313 and a radially inner surface of the first coupling 262 and roller elements 330 may be disposed between a respective groove in the plurality of grooves 328 and a radially inner surface of second coupling 264.

Roller elements 330 may maintain alignment between first axle 212 and second axle 214 and react any moment that might be generated by forces applied to outer surface 202 in the radially outer direction. In that regard, roller elements 330 may allow for first axle 212 and second axle 214 to move relative to one another axially (i.e., in the x direction) while maintaining alignment radially (i.e., in the y direction). In various embodiments, by roller assembly 100 including roller elements 330, may provide a more efficient axial and/or linear type bearing compared to typical roller assemblies.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A roller assembly, comprising:
   a first axle including a first flange and a first inner shaft;
   a second axle including a second flange and a second inner shaft, the first inner shaft extending from the first flange toward the second flange, the second inner shaft extending from the second flange toward the first flange;
   a first plurality of roller elements disposed between a radially outer surface of the second inner shaft and a radially inner surface of the first inner shaft; and
   a biasing member including at least one link or cam roller positioned at an angle relative to a roller axis producing an axial force based on the applied load on the roller reacting to the first or second inner shaft,
   wherein the second inner shaft comprises a plurality of grooves configured to receive the first plurality of roller elements, and wherein the plurality of grooves are semi-spherical in shape.

2. The roller assembly of claim 1, further comprising at least one biasing member including at least one of a torsion spring, a compression spring or a spring washer reacting on to the first or second inner shaft.

3. The roller assembly of claim 1, further comprising a first coupling disposed between a first support bearing and a first outer shaft of the first axle, wherein the first outer shaft extends from the first flange away from the second flange, and wherein a second plurality of roller elements are disposed between a radially outer surface of the first outer shaft and a radially inner surface of the first coupling.

4. The roller assembly of claim 3, further comprising a second coupling disposed between a second support bearing and a second outer shaft of the first axle, wherein the second outer shaft extends from the second flange away from the first flange, and wherein a third plurality of roller elements are disposed between a radially outer surface of the first outer shaft and a radially inner surface of the coupling.

5. The roller assembly of claim 3, further comprising a roller, a first side plate coupled to the first coupling, and a second side plate disposed opposite the first side plate, the roller disposed between the first side plate and the second side plate.

6. The roller assembly of claim 5, further comprising a first tension strap extending from the first side plate to the second side plate and a second tension strap extending from the first side plate to the second side plate, the roller disposed between the first tension strap and the second tension strap.

7. A roller assembly for a cargo loading system, comprising:
- a roller having an outer surface;
- a housing radially inward from the outer surface;
- a first side plate;
- a second side plate disposed opposite the first side plate, the roller disposed between the first side plate and the second side plate;
- a first tension strap extending from the first side plate and the second side plate, the roller disposed adjacent to the first tension strap;
- a brake arrangement retained within the housing; and
- an axle assembly disposed at least partially within the housing, the axle assembly configured to apply a compressive force to the brake arrangement, the axle assembly including a first axle having a first inner shaft and a second axle having a second inner shaft,
- wherein the roller assembly comprises a first plurality of roller elements disposed between the first inner shaft and the second inner shaft,
- wherein the roller assembly further comprises a first coupling and a first bearing support,
- wherein the first axle further comprises a first outer shaft,
- wherein the first coupling is disposed between the first bearing support and the first outer shaft, and
- wherein a second plurality of roller elements are disposed between the first coupling and the first outer shaft.

8. The roller assembly for the cargo loading system of claim 7, wherein the brake arrangement is configured to produce a braking force proportional to a load on the outer surface.

9. The roller assembly for the cargo loading system of claim 7, wherein the axle assembly comprises a first plunger and a second plunger configured to apply the compressive force to the brake arrangement.

10. The roller assembly for the cargo loading system of claim 9, wherein the first plunger and the second plunger are configured to translate towards the brake arrangement in response a load on the outer surface.

11. The roller assembly for the cargo loading system of claim 7, further comprising a second tension strap extending from the first side plate to the second side plate, the roller disposed between the first tension strap and the second tension strap.

12. A cargo loading system, comprising:
- a tray having a first side wall, a second side wall, and a base extending between the first side wall and the second side wall; and
- a roller assembly having a roller and disposed between the first side wall and the second side wall, the roller assembly including a brake arrangement positioned at least partially within a housing of the roller assembly and configured to increase resistance to rotation of the housing proportionally to a load applied against an outer surface of the roller,
- wherein the roller assembly comprises a first axle having a first inner shaft, a second axle having a second inner shaft, and a first plurality of roller elements disposed between the first inner shaft and the second inner shaft,
- wherein the roller assembly further comprises a first coupling and a first bearing support,
- wherein the first axle further comprises a first outer shaft,
- wherein the first coupling is disposed between the first bearing support and the first outer shaft, and
- wherein a second plurality of roller elements are disposed between the first coupling and the first outer shaft.

13. The cargo loading system of claim 12, wherein the roller assembly comprises a first tension strap coupled to the first side wall and the second side wall and a second tension strap coupled to the first side wall and the second side wall, the roller disposed between the first tension strap and the second tension strap.

14. The cargo loading system of claim 12, wherein the roller assembly further comprises a second coupling and a second bearing support, wherein the second axle further comprises a second outer shaft, wherein the second coupling is disposed between the second bearing support and the second outer shaft, and wherein a third plurality of roller elements are disposed between the second coupling and the second outer shaft.

15. The cargo loading system of claim 12, wherein the second inner shaft comprises a plurality of grooves disposed in a radially outer surface of the second inner shaft, and wherein the first plurality of roller elements are disposed in the plurality of grooves.

\* \* \* \* \*